(12) United States Patent
Webber

(10) Patent No.: US 7,922,200 B2
(45) Date of Patent: Apr. 12, 2011

(54) INFLATABLE CUSHION ASSEMBLY INCLUDING BREAKABLE TETHER STITCHES

(75) Inventor: James L. Webber, Shelby Township, MI (US)

(73) Assignee: Autoliv Development AB, Vargarda (SE)

( * ) Notice: Subject to any disclaimer, the term of this patent is extended or adjusted under 35 U.S.C. 154(b) by 163 days.

(21) Appl. No.: 12/420,861

(22) Filed: Apr. 9, 2009

(65) Prior Publication Data

US 2010/0259035 A1  Oct. 14, 2010

(51) Int. Cl.
*B60R 21/18* (2006.01)

(52) U.S. Cl. .................... 280/743.2; 260/732

(58) Field of Classification Search ........... 280/743.2, 280/732; 188/371, 375, 376
See application file for complete search history.

(56) References Cited

U.S. PATENT DOCUMENTS

| | | | | |
|---|---|---|---|---|
| 4,538,702 A * | 9/1985 | Wolner | | 182/3 |
| 5,113,981 A * | 5/1992 | Lantz | | 188/371 |
| 5,489,119 A * | 2/1996 | Prescaro et al. | | 280/743.2 |
| 5,765,867 A * | 6/1998 | French | | 280/743.2 |
| 6,502,858 B2 | 1/2003 | Amamori | | |
| 7,726,350 B2 * | 6/2010 | Jennings et al. | | 139/383 R |
| 7,784,819 B2 * | 8/2010 | Lawall et al. | | 280/728.3 |
| 2002/0175511 A1 * | 11/2002 | Dunkle et al. | | 280/743.2 |
| 2007/0132222 A1 * | 6/2007 | Thomas et al. | | 280/743.2 |
| 2007/0152435 A1 * | 7/2007 | Jamison et al. | | 280/743.2 |
| 2007/0210568 A1 * | 9/2007 | Thomas et al. | | 280/743.2 |
| 2010/0019476 A1 * | 1/2010 | Pausch | | 280/742 |
| 2010/0140910 A1 * | 6/2010 | Fischer et al. | | 280/743.2 |

* cited by examiner

*Primary Examiner* — Paul N Dickson
*Assistant Examiner* — Karen A Beck
(74) *Attorney, Agent, or Firm* — Harness, Dickey & Pierce, P.L.C.

(57) ABSTRACT

An inflatable cushion assembly includes a tether having an attachment end attached to an inflatable cushion. The tether comprises one or more seams extending along an axis and defining a pocket adjacent the attachment end. The seam includes a series of breakable stitches having a first stitch adjacent a pocket and the series of stitches successively disposed along the axis away from the pocket. A seam ripper is received in the pocket, and secured remote from the tether. Deployment of the inflatable cushion pulls the seam ripper along the axis away from the attachment end to successively break the series of stitches.

20 Claims, 4 Drawing Sheets

INFLATABLE CUSHION ASSEMBLY INCLUDING BREAKABLE TETHER STITCHES

TECHNICAL FIELD

This invention relates to an inflatable cushion assembly comprising a tether attached to the inflatable cushion and a seam that includes a series of stitches. More particularly, this invention relates to such inflatable cushion assembly further comprising a seam ripper received in a pocket of the tether and adapted to break the series of stitches during inflation of the cushion.

BACKGROUND OF INVENTION

It is known to equip an automotive vehicle with an airbag system to protect an occupant during a crash event. The airbag system comprises an inflatable cushion, commonly referred to as an airbag, that inflates and restrains the head and torso of the occupant. In general, the cushion is designed to provide optimum restraint for an occupant in a normal seated position. When the occupant is not in a normal seated position, for example, leaning forward, contact between the head and the cushion during inflation may accelerate the head rearward. Under these circumstances, excess energy is transferred to the head relative to the torso, and may result in head or neck injury.

Therefore, there is a need for an airbag system comprising a cushion that is inflatable to provide optimum restraint for a head and torso of an occupant in a normal seated position, and further reduces energy transfer to the head in the event that the occupant is not in the normal seated position, for example, leaning forward.

SUMMARY OF THE INVENTION

In accordance with this invention, an inflatable cushion assembly is deployable to protect an occupant in a vehicle seat. The inflatable cushion assembly comprises an inflatable cushion defining an interior. A tether is disposed within the interior of the inflatable cushion and has an attachment end attached to the inflatable cushion. The tether comprises a first fabric layer and a second fabric layer attached by a seam. The seam defines a pocket adjacent the attachment end and extends along an axis. The seam comprises a series of breakable stitches that includes a first stitch adjacent the pocket and successive stitches disposed along the axis in a direction away from the pocket. The inflatable cushion assembly also comprises a seam ripper received in the pocket and is secured remote from the tether. Upon inflation of the inflatable cushion, the seam ripper is pulled along the axis away from the attachment end breaking the first stitch and thereafter progressively breaking the series of stitches.

In accordance with another aspect of this invention, a method is provided for deploying an inflatable cushion to protect an occupant in a vehicle seat. The method comprises attaching a tether to an interior of the inflatable cushion. The tether includes an attachment end attached to the inflatable cushion. Additionally, the tether includes a seam extending along an axis and defining a pocket adjacent the attachment end. The seam includes a series of breakable stitches that have a first stitch adjacent the pocket and successive stitches disposed along the axis in a direction away from the pocket. The method also includes inserting a seam ripper into the pocket. The seam ripper is secured remote from the pocket. The method further includes inflating the inflatable cushion. During inflation of the inflatable cushion, the seam ripper is pulled along the axis in a direction away from the pocket to engage and break the first stitch and the successive stitches.

BRIEF DESCRIPTION OF THE DRAWINGS

This invention will be further described with reference to the accompanying drawings in which.

DETAILED DESCRIPTION OF THE PREFERRED EMBODIMENT

Figure 1:
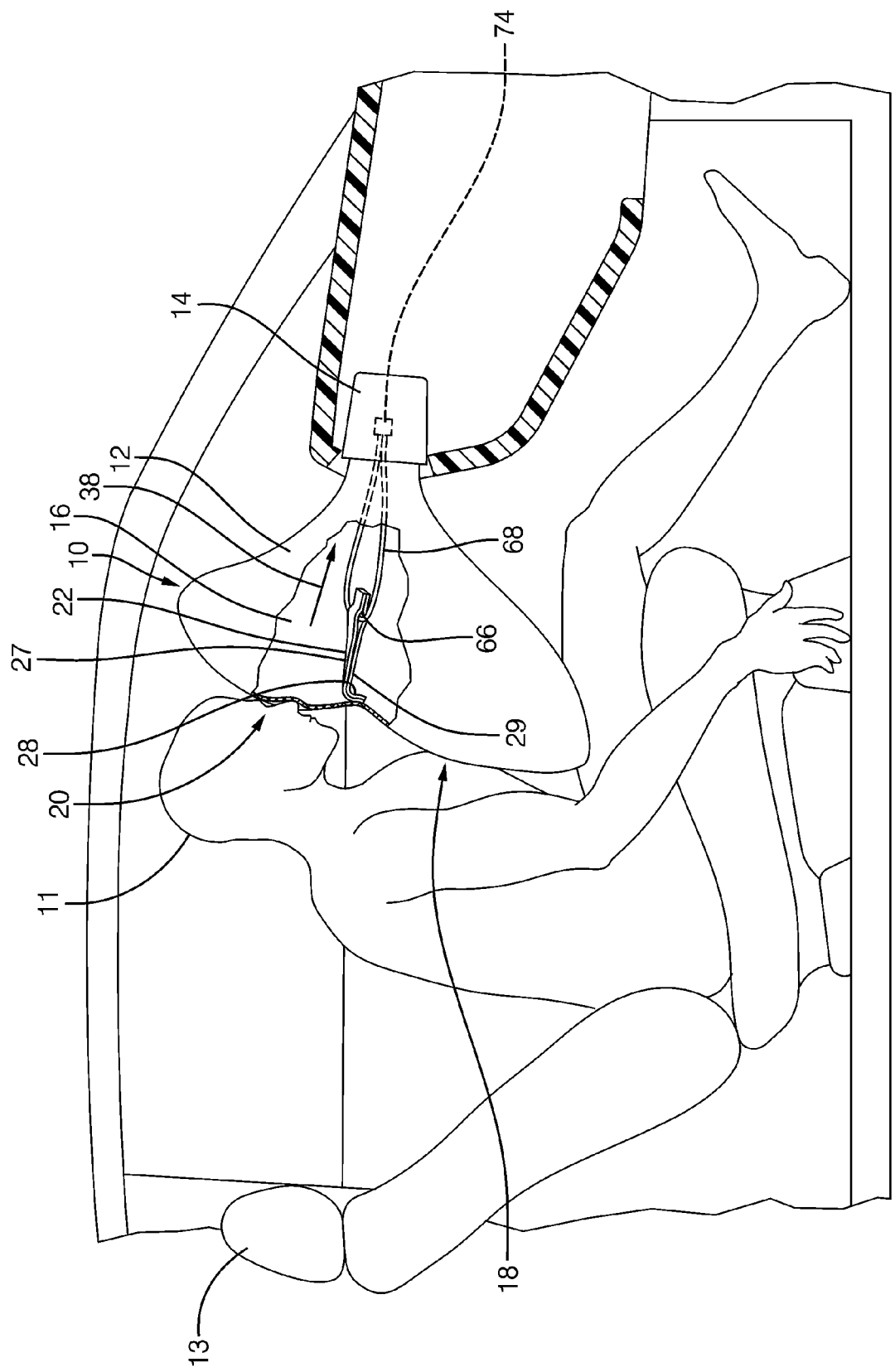
FIG. 1 is a plan view of a vehicle having the inflatable cushion assembly in accordance with the present invention.

In accordance with an embodiment of this invention, referring to FIGS. 1-4, an inflatable cushion assembly 10 comprises an inflatable cushion 12, also referred to as an airbag, and a housing 14. Cushion 12 is depicted in FIG. 1 during deployment in response to a vehicle collision event. Prior to deployment, cushion 12 is folded and stored in housing 14, which is installed in the automotive vehicle. Activation of assembly 10, referring to FIG. 1, deploys cushion 12 out from housing 14 to protect an occupant 11 in a vehicle seat 13. Cushion 12 is typically formed of a single layer of fabric, suitably a polyester and nylon material. Cushion 12 defines an interior 16, and includes an area 18 adapted for restraining a torso of occupant 11, and an area 20 adapted for restraining a head of the occupant.

In accordance with this invention, the assembly includes an energy absorbing tether 22, also referred to as a zip tether. In this embodiment, referring to FIGS. 1-3, tether 22 comprises a first layer 27 and a second layer 29, which are preferably formed of a fabric material similar to the cushion. In this example, layers 27 and 29 are formed of separate fabric sheets. Alternately, the tether may be formed of a fabric layer attached to the cushion, so that the cushion constitutes the second layer of the tether.

Tether 22 includes an attachment end 28 that is attached by stitching to interior surface 24 of cushion 12. In this example, attachment end 28 is attached to cushion 12 adjacent the head restraint area 20 to reduce the energy with which the cushion is deployed in this area. Tether 22 comprises seams 30a, 30b and 30c that sew layer 27 to layer 29 and extend along an axis A along the length of tether 22. Each seam 30 comprises a series of breakable stitches 32. Seams 30a, 30b and 30c are disposed in axial rows with a first stitch 34a, 34b, 34c adjacent attachment end 28 and a series of successive stitches 36a, 36b, 36c successively disposed along axis A in a direction 38 away from the first stitch.

Figure 3:
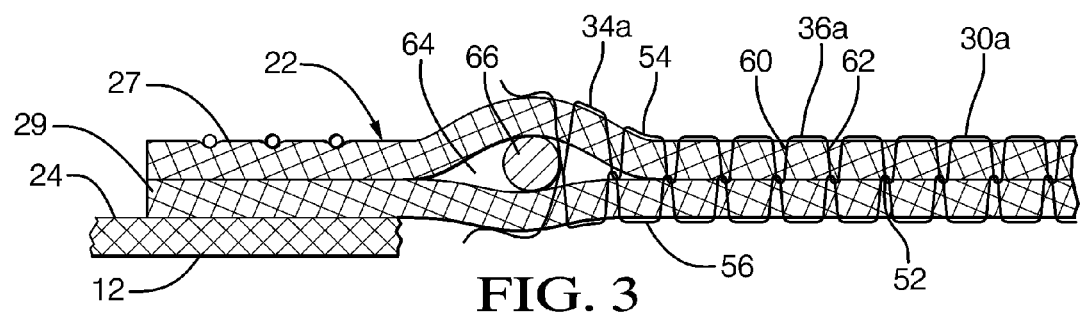
FIG. 3 is a cross sectional view of the portion of FIG. 2.

In this example, seams 30a, 30b and 30c are formed of a lockstitch. As shown in FIG. 3 for seam 30b, the seam comprises a series of lockstitches 52 formed by interlocking an upper thread 54 that penetrates layer 27 and a lower thread 56 that penetrates the layer 29 and interlocks with thread 54. Moreover, each stitch penetrates the layers at a first penetration point 60 and a second penetration point 62, which are spaced apart along axis A. While this example includes a lockstitch, the fabric may be sewn by a chain-stitch or any other stitching type suitable to attach the layers.

In accordance with this invention, seams are formed of the breakable threads to allow the seam to be broken during deployment. For this purpose, a weight of the thread is selected that is weaker than the fabric material of the tether or cushion. For a conventional cushion fabric formed of about 630 denier yarn, stitching formed of about 930 denier is suitable and readily commercially available. Thread that is about 690 denier is also suitable, but requires less force to break, and so necessitates more stitches to absorb equal force. In general, it is believed that threads that have weight between about 600 and 1400 denier provide an effective breaking force that provide the desired reduction in energy of the adjacent area of the cushion.

Tether comprises a pocket 64 formed between layers 27 and 29 intermediate the adjacent attachment end 28 and first stitches 34a, 34b, 34c. An anchor 68 comprises a seam ripper 66 received in pocket 64. In this example, anchor 68 is formed of a braided steel cable having a loop that runs through the pocket to form the seam ripper. In this example, anchor 68 is attached to housing 14 by fastener 74. It is desired that that cable for anchor 68 be suitably sized to shear the stitching in a predictable manner. If the diameter of the anchor is too large or too small, undesired inflation of the airbag may occur if the anchor tears or cuts the fabric of the tether or the cushion as opposed to shearing the stitches. Alternately, the anchor may be formed from a rounded stamped metal piece or a solid wire.

Figure 4:
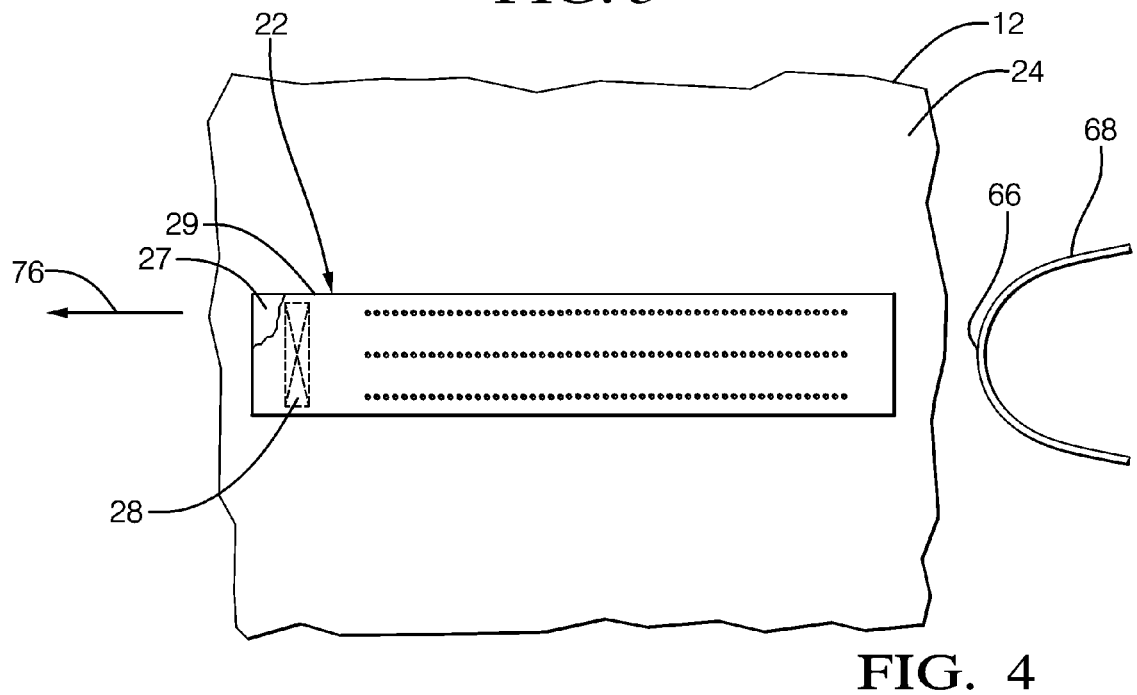
FIG. 4 is a view of the portion of the inflatable cushion assembly in FIG. 2, following deployment of the cushion.

For storage prior to deployment, cushion 12, including tether 22 and anchor 68 are folded in a compact manner to fit within housing 14 in a relatively small packaging space. In response to a crash event, assembly 10 is deployed by inflating cushion 12 using inflation gas that flows into housing 14. Upon inflation, torso area 18 advances rapidly in the direction toward the torso of an adult occupant. Head area 20 advances until anchor 68 is pulled taut against first stitches 34a, 34b and 34c. Upon further inflation of the cushion 12, seam ripper 66 exerts a force on seams 30 sufficient to shear the first stitches 34a, 34b, and 34c in seams 30, whereupon the cushion expands until the seam ripper is pulled against the second stitch. Upon breaking the second stitches, seam ripper 66 is pulled against, and breaks, the third stitches, and so forth. As the stitches break, the energy with which the head area expands is reduced. Upon breaking all stitches in the series 32, anchor 68 is pulled free from tether 22, as shown in FIG. 4, with tether 22 remaining attached to cushion 12 at attachment end 28.

Figure 2:
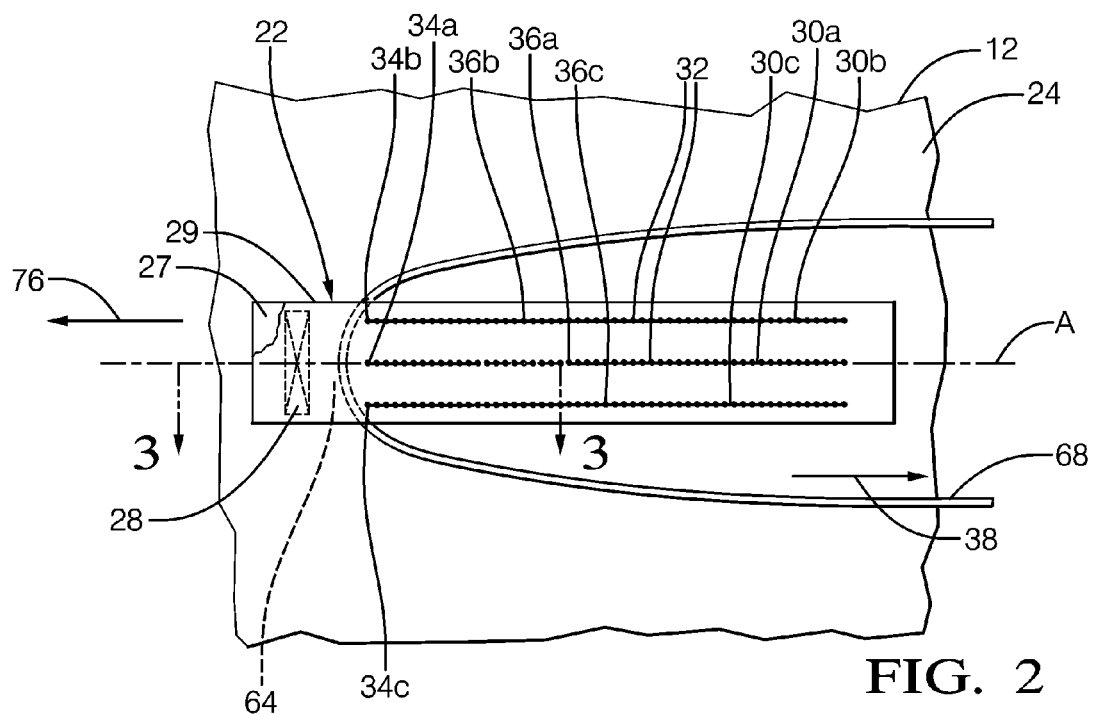
FIG. 2 is a view of a portion of the inflatable cushion assembly in FIG. 1, prior to deployment of the cushion.

A method for deploying an inflatable cushion 12 is provided. Referring to FIGS. 1-3, the method includes attaching a tether 22 to an interior 16 of inflatable cushion 12. Tether 22 comprises an attachment end 28 attached to inflatable cushion 12. Seams 30a, 30b and 30c extend along an axis A and define a pocket 64 adjacent attachment end 28. Seams 30a, 30b and 30c include a series of breakable stitches 32 that further includes a first stitch 34a, 34b and 34c adjacent pocket 64 and successive stitches 36a, 36b and 36c disposed along axis A in a direction 38 away from pocket 64. The method further includes inserting a seam ripper 66 into pocket 64. Seam ripper 66 is secured remote from pocket 64. During inflation, seam ripper 66 pulls along axis A in direction 38 away from pocket 64 to engage and break first stitches 34a, 34b and 34c and successive stitches 36a, 36b and 36c.

While not limited to any particular theory, it is believed that, as the cushion is deployed during inflation, inflation gas expands with substantially uniform pressure, so that the pressure applied upon areas of the cushion is substantially uniform. As a result, in the absence of a tether, the areas expand at substantially uniform speed and with substantially uniform energy. For a cushion equipped with a zip tether in accordance with this invention, the breaking of the stitches absorbs energy. As a result, expansion energy of the adjacent area is reduced. By strategically attaching the zip tether adjacent areas where reduced energy is desired, for example, a head restraint area, the impact energy is reduced. On the other hand, the tether has minimal affect upon the expansion of remote areas, such as the torso restraint area.

Thus, this invention provided an inflatable cushion assembly having areas of differing deployment velocity to provide optimum occupant protection. This is accomplished using a tether suitably formed of fabric material similar to the cushion, thereby improving performance while minimizing cost and weight. The tether absorbs energy of the inflation gas by breaking the series of stitches in a predictable manner. Because the stitches break, the ultimate shape of the inflated cushion is not affected. The ripping force needed to break the stitches depends upon the strength of the thread, the number of stitches, and the diameter of the anchor. By selecting thread size and stitch location, the expansion force of the adjacent area may be optimized for a particular application.

Figure 5:
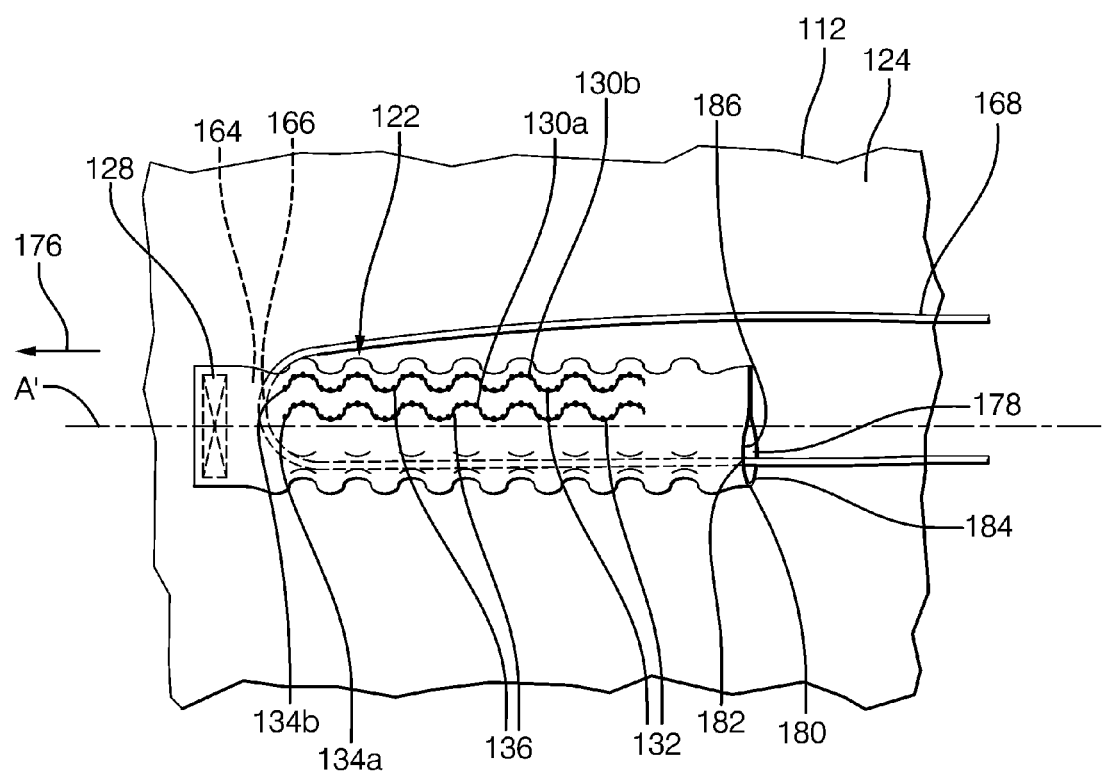
FIG. 5 is a view of a portion of the inflatable cushion assembly in accordance with an alternate embodiment of this invention, shown prior to deployment of the inflatable cushion.
Figure 6:
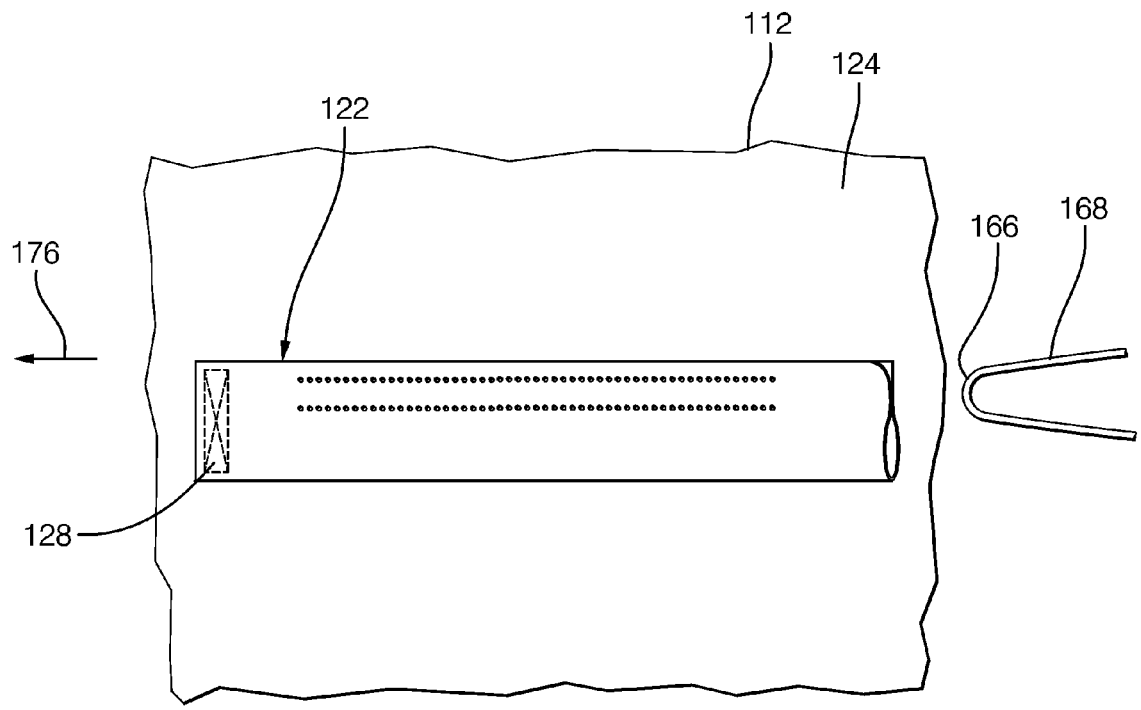
FIG. 6 is a view of a portion of the inflatable cushion assembly in FIG. 4, shown following deployment of the inflatable cushion.

In the embodiment in FIGS. 1-4, the tether is formed of two fabric sheets stitched together. Alternately, the layers may be formed by folding a single sheet of fabric. Referring to FIGS. 5-6, an inflatable cushion assembly includes an inflatable cushion 112 and a tether 122 formed of a single folded fabric sheet 178. Tether 122 is formed of material similar to cushion 112. Tether 122 comprises an attachment end 128 attached to an interior surface 124 of cushion 112. Sheet 178 comprises an axial fold 180 along an axis A'. Axial fold 180 in tether 122 forms a first layer 182 and a second layer 184.

Tether 122 comprises seams 130a and 130b along axis A' across the length of tether 122. Seams 130a and 130b comprise a series of breakable stitches 132. Stitches 132 further include a first stitch 134a and 134b adjacent attachment end 128. Successive stitches 136 are successively disposed along axis A' away from first stitch 134a and 134b along tether 122. Seam 130 sews layers 182, 184 of tether 122, so that stitches 132 extend between layers 182, 184 of tether 122. As in the embodiment in FIGS. 1-4, stitches 132 include a first penetration point and a second penetration point that are spaced apart along axis A'.

Seams 130a and 130b define a pocket 164 adjacent attachment end 128. Pocket 164 defines an opening disposed between tether 122 and interior surface 124 of cushion 112. An anchor 168 is received through an aperture 186 in tether 122 along axis A' between seam 130a and axial fold 180, and includes a seam ripper 166 in pocket 164. Anchor 168 is fastened to a housing (not shown).

Referring to FIG. 6, with deployment of cushion 112, seam ripper 166 shears stitches 132 opposite pull force 176 of cushion 112, in a similar manner to that described with respect to FIGS. 1-3, and becomes free from tether 122.

Figure 7:
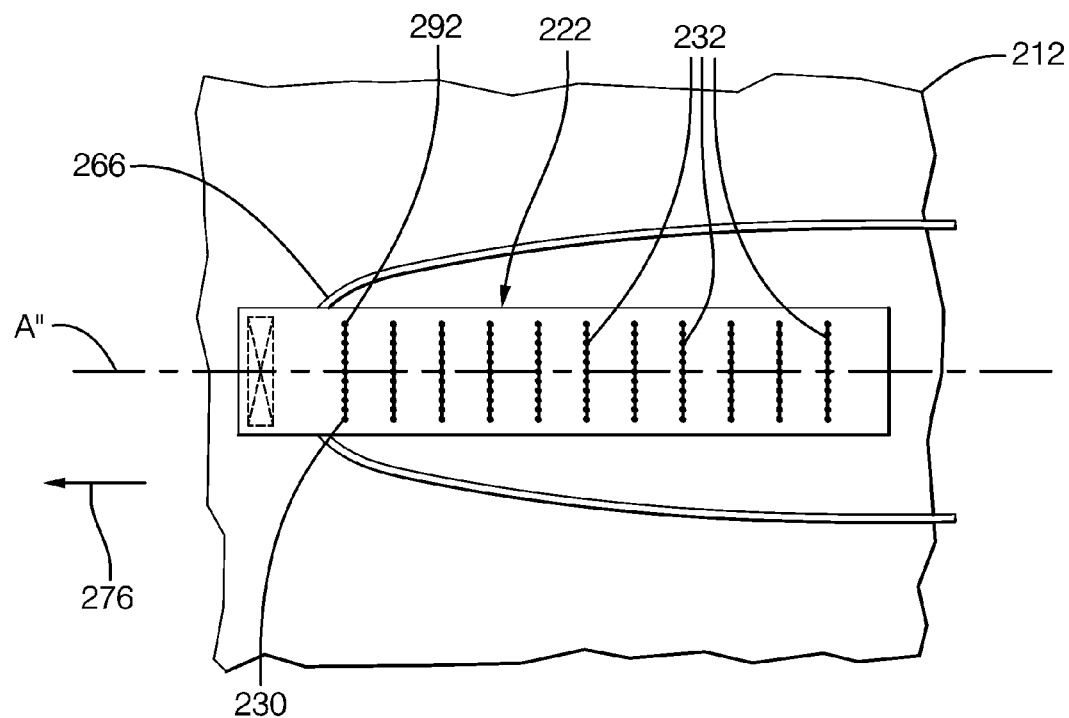
FIG. 7 is a view of a portion of the inflatable cushion in accordance with another embodiment of this invention.

In a further embodiment, referring to FIG. 7, there is depicted a cushion 212 and a tether 222 comprising a series of breakable stitches 232 that are disposed in seams that extend perpendicular to an axis A". Stitches 232 comprise a first seam 290 adjacent the pocket perpendicular to axis A", and further stitches disposed in rows that extend successively away from the pocket along the axis A". While the seams are made such that successive penetration points are perpendicular to the axis, the stitches may be viewed as arranged in rows that extend along the axis A", that is with the first stitch in one row aligning with the first stitch in the next row, and so forth. Upon deployment of cushion 212 in a direction 276, a seam ripper 266 is pulled axially to break the first row of stitches 232 before engaging and breaking the second row and so forth.

Figure 8:
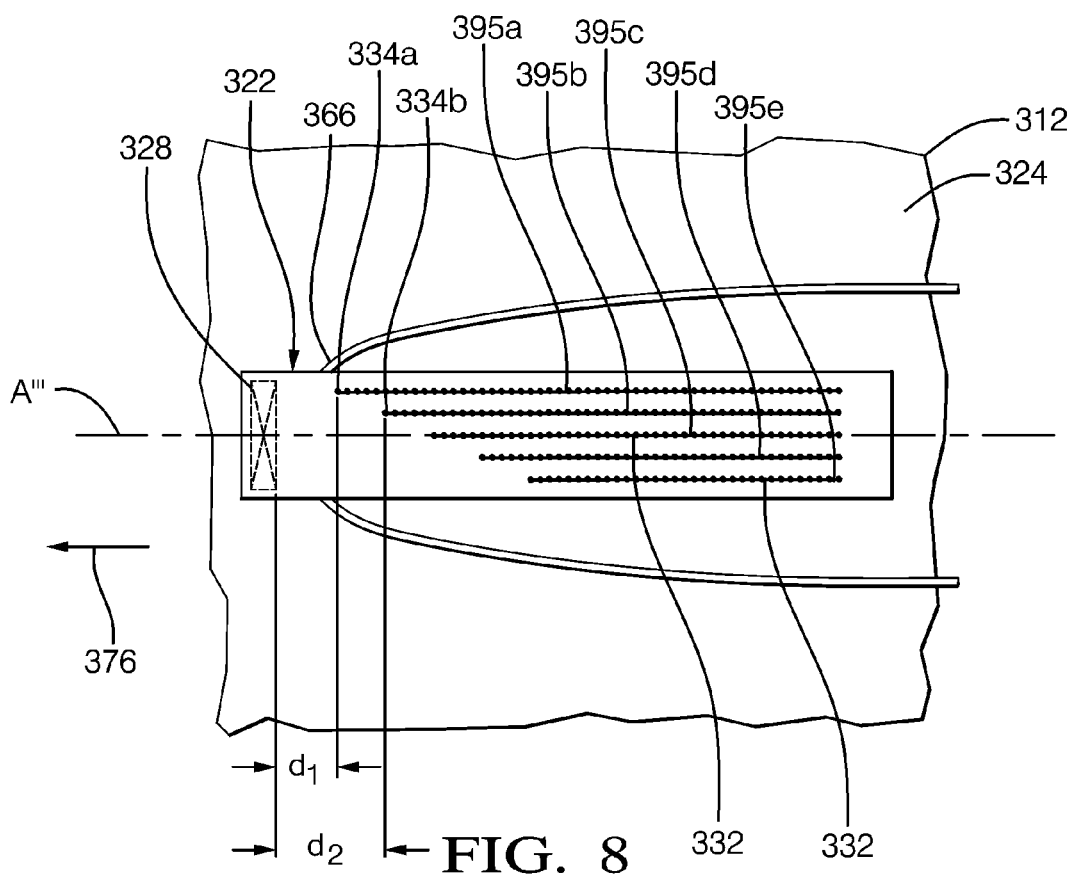
FIG. 8 is a view of a portion of the inflatable cushion in accordance with yet another embodiment of this invention.

In yet a further embodiment, referring to FIG. 8, a plurality of seams 395 can be sewn in tether 322 on interior surface 324 of cushion 312. Each seam 395a, 395b, 395c, 395d, 395e is in axial, parallel, spaced relationship along axis A'''. Each seam begins at an increased distance from that attachment end 328. Seam 395a includes a first stitch 334a spaced apart from an attachment end 328 by a distance $d_1$. Seam 395b includes a first stitch 334b proximate to, and spaced apart from, the attachment end by a second distance $d_2$, greater than $d_1$. Seam ripper 366 progressively breaks stitches 332 in an increasing number of seams 395 with deployment of cushion 312 in direction 376. The number of rows of the stitching is suitable to be varied dependent on the energy absorption requirements required for the cushion and the pull force needed to break the series of breakable stitches.

In the described embodiments, the tether in accordance with this invention was employed to optimize deployment of a frontal airbag. Alternately, the tether may be employed in a side curtain airbag.

In one aspect of this invention, the tether having breakable stitches is utilized in a low risk deployment air bag system where the energy requirements for inflation of the inflatable cushion are designed into the stitch pattern sewn in the tether. With inflation of the inflatable cushion, energy is absorbed by the stitches as the inflatable cushion extends outward into a vehicle with the anchor breaking the stitches at a rate dependent on the stitch pattern sewn in the tether.

While this invention has been described in terms of the preferred embodiment thereof, it is not intended to be so limited, but rather only to the extent set forth in the claims that follow.

I claim:

1. An inflatable cushion assembly deployable for protecting an occupant in a vehicle seat, comprising:
   an inflatable cushion defining an interior;
   a tether disposed within the interior of the inflatable cushion and attached to the inflatable cushion at an attachment end, said tether comprising a first fabric layer, a second fabric layer, and a series of breakable stitches extending along an axis and defining a pocket adjacent the attachment end, said series comprising a first stitch adjacent the pocket and successive stitches disposed along the axis in a direction away from the pocket; and
   a seam ripper received in the pocket and secured remote from the tether such that, upon inflation of the inflatable cushion, the tether is pulled along the axis to cause the seam ripper to successively break the series of breakable stitches.

2. The inflatable cushion assembly of claim 1, wherein the seam ripper is an anchor having a loop extending through the pocket.

3. The inflatable cushion assembly of claim 1, wherein the inflatable cushion comprises a torso restraint area and a head restraint area, and wherein the attachment end is attached adjacent to the head restraint area.

4. The inflatable cushion assembly of claim 1, wherein the second layer is the inflatable cushion.

5. The inflatable cushion assembly of claim 1, wherein the series is a first seam axially disposed in a first row, and the tether further comprises a second seam comprising a series of breakable stitches axially disposed in a second row in parallel, spaced relationship to the first row.

6. The inflatable cushion assembly of claim 5, wherein the first stitch of the first row is spaced apart from the attachment end by a first distance, and the second seam comprises a first stitch proximate the attachment end and spaced apart therefrom by a second distance greater than the first distance.

7. The inflatable cushion assembly of claim 1, wherein each stitch includes a first penetration point and a second penetration point spaced apart from the first penetration point along the axis such that the seam ripper portion engages the first penetration point prior to engaging the second penetration point.

8. The inflatable cushion assembly of claim 1, wherein each stitch includes a first penetration point and a second penetration point spaced apart from the first penetration point in a direction perpendicular to the axis such that the seam ripper concurrently engages the first penetration point and the second penetration point.

9. The inflatable cushion assembly of claim 1, wherein the tether comprises a sheet folded such that the first fabric layer overlies the second fabric layer and forms an axial fold therebetween, and further comprising an anchor extending between the fold and the seam and including the seam ripper disposed within the pocket adjacent the attachment end.

10. The inflatable cushion assembly of claim 1, further comprising a housing, said anchor being secured to the housing.

11. A method for deploying an inflatable cushion to protect an occupant in a vehicle seat, comprising:
    attaching a tether to an interior of the inflatable cushion, said tether comprising an attachment end attached to the inflatable cushion and a series of breakable stitches extending along an axis and defining a pocket adjacent the attachment end, said series including a first stitch adjacent the pocket and successive stitches disposed along the axis in a direction away from the pocket;
    inserting a seam ripper into the pocket, said seam ripper being secured remote from the pocket; and
    inflating the inflatable cushion to cause the tether to move relative to the seam ripper such that the seam ripper engages and breaks the first stitch and thereafter the successive stitches.

12. The method of claim 11, further comprising securing an anchor at a location remote from the pocket, said anchor comprising the seam ripper.

13. The method of claim 11, wherein the inflatable cushion comprises a torso restraint area and a head restraint area, and wherein the step of attaching comprises attaching the attachment end adjacent to the head restraint area, and the step of inflating the inflatable cushion comprises breaking the stitches to reduce the energy associated with deployment of the head restraint area.

14. The method of claim 11, wherein the step of attaching the tether comprises overlying a first fabric sheet and a second fabric sheet, and stitching to form the seam attaching the first fabric layer and the second fabric layer.

15. The method of claim 11, wherein the step of attaching comprises stitching a first seam axially disposed in a first row, and stitching a second seam of breakable stitches disposed in a second row in parallel, spaced relationship to the first row, and wherein the step of pulling the seam ripper comprises pulling the seam ripper to break the stitches in the first row and the second row.

16. The method of claim 15, wherein the step of inflating the cushion comprises breaking the first stitch in the first row prior to breaking a first stitch in the second row.

17. The method of claim 11, wherein each stitch includes a first penetration point and a second penetration point spaced apart from the first penetration point along the axis, and wherein the step of inflating the cushion comprises breaking the stitch at the first penetration point prior to breaking the stitch at the second penetration point.

18. The method of claim 11, wherein each stitch includes a first penetration point and a second penetration point spaced apart from the first penetration point in a direction perpendicular to the axis, and wherein the step of inflating the cushion comprises concurrently breaking the stitch at the first penetration point and at the second penetration point.

19. The method of claim 11, further comprising forming the tether by folding a fabric sheet along a fold parallel to the axis such that a first layer overlies the second layer, stitching to attach the first layer and the second layer and form a seam of breakable stitches, and inserting an anchor into the tether between the fold and the seam, said anchor comprising the seam ripper disposed within the pocket.

20. The method of claim 11, wherein the seam ripper is a cable loop.

* * * * *